Oct. 7, 1958 — B. BRADY — 2,854,847
METHOD OF TESTING THE SOUNDNESS OF WOODEN POLES
Filed Dec. 2, 1954
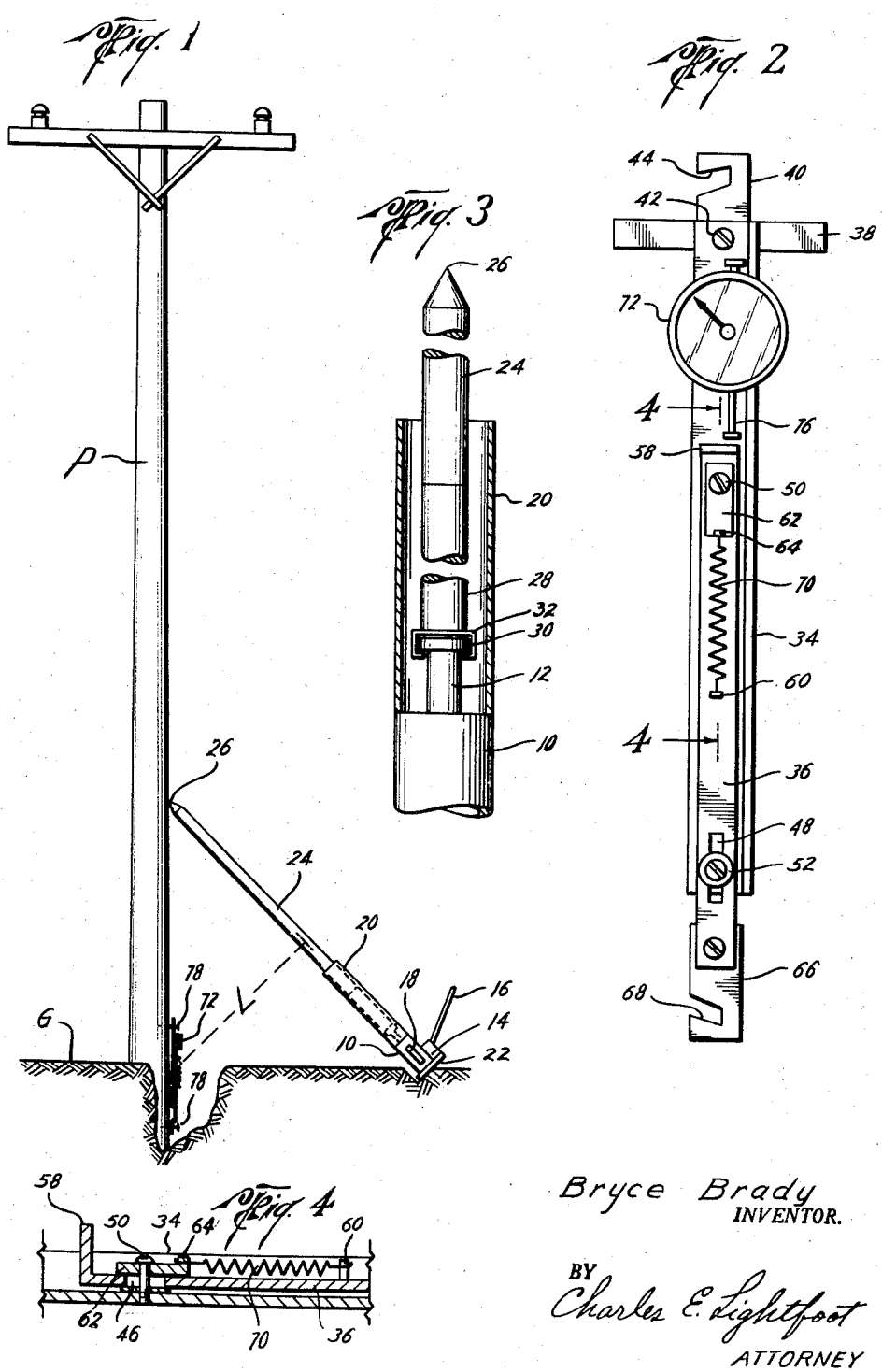
Bryce Brady
INVENTOR.
BY Charles E. Lightfoot
ATTORNEY

United States Patent Office 2,854,847
Patented Oct. 7, 1958

2,854,847

METHOD OF TESTING THE SOUNDNESS OF WOODEN POLES

Bryce Brady, Oklahoma City, Okla.

Application December 2, 1954, Serial No. 472,731

1 Claim. (Cl. 73—100)

This invention relates to a method of testing the soundness of wooden poles, and more particularly to a method of determining the strength and condition of wooden poles after the same have been erected and while in service.

While the invention is capable of general use in the testing of poles or like structures it finds particular application in connection with the testing of wooden poles which have been erected in the ground, such as those used in telephone and electric power systems, to determine the strength and condition of such poles and their fitness for continued service.

Wooden poles, posts, and other wooden structures which are erected in the ground are subject to weathering and decay, which in time reduces their soundness to such an extent that they are likely to be broken off during storms or other adverse conditions.

Heretofore, various methods have been employed for determining the condition of wooden poles while the same are in service, such as by sounding with a hammer, prodding with a sharp rod, or boring holes therein to remove a cylindrical sample or core. These methods have not proven satisfactory, however, because of the undesirability of cutting or drilling holes in the poles and also for the reason that such tests are not sufficient to accurately indicate the fitness of the pole for further service.

The present invention has for an important object the provision of a method of testing the strength and condition of erected wooden piles or like structures whereby their fitness for further service may be accurately determined.

Another object of the invention is to provide a method of testing the soundness of wooden poles without the removal of cores or other substantial cutting or injury of the material of the same.

A further object of the invention is the provision of a method of testing the strength and soundness of a wooden pole, which comprises applying a measured force to a pole at a point located above the level of the ground in a direction to cause a change in the length of the wood fibres near the surface of the pole, and measuring such change of length.

Another object of the invention is to provide a method of testing of erected wooden poles to determine their strength and soundness, which involves the use of a pike pole adapted to be engaged at one end with a pole to be tested at a point above the ground, means engageable with the ground and with the other end of the pike pole, and operable to apply a measured force to the pike pole, whereby such force will be transmitted from the ground to the wooden pole at said point, and means for measuring the change in the length of the wood fibers near the surface of the pole caused by the application of the force thereto.

A further object of the invention is the provision of a method of testing of erected wooden poles to determine their strength and soundness, which involves the use of means adapted to be connected to a wooden pole at longitudinally spaced points thereon and which is operable in response to a change in the length of the surface fibers of the pole to indicate the extent of such change, and means for applying a measured force to the pole at a point above said longitudinally spaced points thereon in a direction to cause a change in length of the wood fibers.

Other important objects and advantages of the invention will become apparent from the following detailed description, constituting a specification of the same, when considered in conjunction with the annexed drawings, wherein—

Figure 1 is a side elevational view of the invention showing the same in its application to a pole to be tested;

Figure 2 is a front elevational view, on an enlarged scale, illustrating the extensometer of the invention, whereby the change in length of the surface fibers of a pole being tested is indicated, and showing the details of construction and arrangement of the parts of the same;

Figure 3 is a fragmentary view partly in cross-section and on an enlarged scale illustrating details of construction of the force transmitting means of the invention; and Figure 4 is a cross-sectional view taken along the line 4—4 of Figure 3, looking in the direction indicated by the arrows.

The invention is illustrated herein in its application to the testing of wooden poles, such as those of the type commonly employed on connection with telephone and electric power transmission lines, it being understood, of course, that the invention may also be used with equally satisfactory results in the testing of numerous other similar types of structures.

Referring now to the drawings in greater detail, wherein a preferred form of apparatus embodied in the invention is illustrated, the force applying means comprises a hydraulic jack of suitable type having a cylinder 10 in which a piston is movably disposed which is connected to a piston rod 12. The jack also has hydraulic pumping mechanism of conventional design, indicated at 14, which may be provided with the usual hand lever 16 whereby the pump may be operated to apply hydraulic pressure to the cylinder 10 to operate the piston therein. A pressure gauge of conventional type, indicated at 18 is also provided, which may be conveniently mounted on the cylinder 10, whereby the hydraulic pressure applied to the cylinder is indicated.

The cylinder 10 has a cylindrical extension 20 at its upper end, which is open at the top, and the cylinder may also be provided with the usual ground engaging foot plate 22 at its lower end.

A pike pole 24 having a pointed upper end 26 is positioned with its lower end extending into the upper end of the cylindrical extension 20, and within the extension a supplementary pike pole section 28 may be disposed, whose lower end rests upon an enlargement 30 on the outer end of the piston rod 12, and upon whose upper end the lower end of the pike pole 24 rests. The section 28 may have a clip 32 of generally C-shape attached to its lower end, whereby the section may be removably attached to the enlargement 30 to retain the section in position in the extension, as best seen in Figure 3.

The section 28 is provided for the purpose of increasing the effective length of the pike pole when needed.

In making use of the force applying means, the hydraulic jack is positioned as shown in Figure 1 with the foot plate 22 in contact with the ground, at a suitable distance from the base of the pole P which is to be tested. The pike pole 24 is then inserted in the extension 20 with its lower end in engagement with the upper end of the supplementary section 28, or, when the section 28 is not required, with its lower ends resting upon the enlargement 30, and the pike pole and jack may then be tilted to bring the pointed end 26 of the pike pole into engagement with the pole P.

With the apparatus thus positioned, the pump 14 may be operated by the hand lever 16 to apply a force to the pike pole, which will be transmitted to the pole P, and this force will be indicated by the gauge 18.

The invention also embodies means for measuring the change in length of the wood fibres of the pole P resulting from the application of the force thereto by the pike pole and jack in the manner just described. The details of construction of a preferred form of extensometer for this purpose are illustrated in Figure 2 of the drawings, wherein the numerals 34 and 36 designate, respectively, two elongated parts which are designed to be arranged in superposed relation for longitudinal sliding movement relative to each other.

The part 34 may be of angular shape in cross-section and is provided with a cross piece 38 at one end for a purpose later to be made apparent. The part 34 also has an extension 40 suitably attached thereto, as by means of a screw 42, and extending beyond the cross piece 38 and having at its outer end a side notch 44.

The part 36 is positioned on the part 34 and is formed with longitudinally spaced, elongated, slotted openings 46 and 48 therethrough through which screws 50 and 52 may be extended into threaded holes, one of which is shown in Figure 4, in the part 34 whereby the part 36 is secured to the part 34 for longitudinal sliding movement relative thereto.

The part 36 is formed at one end with the upturned flange 58 and has an upwardly extending lug 60 mediate its ends.

A clip 62 is positioned on the outer surface of the part 36 and is secured in position by the screw 50 which extends therethrough, and this clip is formed at one end with an upstanding lug 64 positioned in spaced relation to the lug 60 of the part 36. The part 36 also has an extension 66 attached thereto which is similar to the extension 40 and is provided with a similar side notch 68. A coil spring 70 is attached at one end to the lug 60 on the part 36 and at its other end to the lug 64 of the clip 62, whereby the parts will be moved longitudinally relative to each other in a direction to decrease the distance between the side notches 44 and 68, until the screws 50 and 52 engage the part 36 at the ends of the openings 46 and 48 to limit such movement.

A gauge 72 of conventional dial type is suitably anchored to the part 34, as by bolting or the like, and has a movable plunger 76 whose outer end is positioned in engagement with the flange 58 of the part 36, whereby the amount of relative longitudinal movement of the parts may be accurately determined.

The extensometer described above is applied to the pole P, by driving two nails 78, 78 into the pole at longitudinally spaced points thereon, which are substantially in vertical alignment, the ground being excavated at the base of the pole a sufficient distance to allow the lower nail to be positioned at a point below the ground level substantially equal to the distance at which the upper nail is located above the ground level. The extensometer is then positioned against the pole with the nails in the side notches 44 and 68 and the cross piece 38 in contact with the pole. The dial gauge 72 is then adjusted to zero.

The hydraulic jack and pike pole are then placed in position to exert a force on the pole, in the manner previously described, the pike pole being arranged at an angle of about 45 degrees to the vertical with its pointed upper end 26 in engagement with the pole P at a point substantially in vertical alignment with the nails. In the event that the ground is soft, a shovel blade or the like may be placed beneath the foot plate of the hydraulic jack.

The jack is then operated to apply a substantial measured force to the pole P through the pike pole, and the change in length observed on the dial gauge. By suitable correlation of the data thus obtained with the circumference of the pole at the ground level and the distance L from the surface of the pole P at the center of the extensometer to the axis of the pike pole, taking into consideration the condition of the ground, whether wet, damp, dry or very dry, the strength of the pole P may then be calculated.

It will be apparent from an inspection of Figure 1, that the bending moment applied to the pole P at the ground line will be equal to the force applied by the pike pole in the direction of its axis multiplied by the distance L.

As a concrete example of the practice of the invention, the following data were obtained by the use of the apparatus and method described above:

| Pole Identification | P Pressure Gauge Reading, lb./sq. in. | E Dial Gauge Reading, Mils | L Length, Inches | C Circumference, Inches | Soil Moisture |
|---|---|---|---|---|---|
| Mile 2 Pole 3 | 900 | 6 | 43 | 31 | Dry. |

From this data the strength of the pole in lb.-ft. of ultimate bending moment may be calculated in accordance with the following formula:

$$\text{Strength} = \frac{KPL}{E} = \frac{3.5 \times 900 \times 43}{6} = 22,600 \text{ lb.-ft.}$$

in which K is obtained from the following table:

| Moisture Condition at Time of Test | Value of K When $\frac{PL}{EC^3}$ is equal to or less than .3 (old poles) | Value of K When $\frac{PL}{EC^3}$ is more than .3 (new poles) |
|---|---|---|
| Wet | 4.3 | 5.4 |
| Damp | 3.9 | 4.9 |
| Dry | 3.5 | 4.4 |
| Very Dry | 3.1 | 4.0 |

The value of the constant K is dependent upon the following factors: piston area of the hydraulic jack, length of the extensometer, modulus of elasticity of the wood specie (or average of commonly used species), modulus of rupture of the wood specie, moisture condition of the soil surrounding the pole, circumference of the pole in inches, and correction factors to compensate for the deterioration in the pole as derived from test data.

It will also be apparent that the strength of the pole P may be determined with equal facility by placing the extensometer on the pole in a location opposite to that illustrated in Figure 1, in which case the shortening in the length of the pole fibers, which will be under compression, may be measured.

It will thus be seen that the invention provides a simple and reliable method whereby the remaining ground-line strength in pound-feet of ultimate bending moment of wooden poles and like structures may be quickly and accurately determined while the same are in service. The strength of the pole obtained in this manner may be compared with the strength of new poles of the same character, or with the wind and ice load conditions which such poles may be required to withstand, in order to determine the adequacy of the pole for continuance in service.

While the invention has been disclosed herein in connection with a particular embodiment of the apparatus employed and with certain specific procedural steps in the method used, it will be understood that these are intended by way of illustration only, and that various changes can be made in the construction and arrangement of the various parts of the equipment, as well as in the steps of the method, within the spirit of the invention and the scope of the appended claim.

Having thus clearly shown and described the invention, what is claimed as new and desired to secure by Letters Patent is:

A method of testing the ground-line strength of a wooden pole erected with its lower end portion inserted in the ground, which comprises establishing vertically aligned reference points on the surface of the pole, one of said points being located above the normal ground level and the other below the normal ground level, applying a measured thrust between an elevated point on the pole directly above said reference points and a point on the ground spaced from the pole, and measuring the change in the distance between said vertically spaced points affected by the application of said thrust.

References Cited in the file of this patent

UNITED STATES PATENTS

| | | |
|---|---|---|
| 1,775,828 | Patton | Sept. 16, 1930 |
| 2,231,702 | Burgwin | Feb. 11, 1941 |
| 2,263,247 | Raisanen | Nov. 18, 1941 |
| 2,276,816 | Bagno | Mar. 17, 1942 |
| 2,283,730 | Gardner | May 19, 1942 |
| 2,299,722 | Burns | Oct. 27, 1942 |
| 2,499,033 | Oberholtzer | Feb. 28, 1950 |
| 2,583,945 | Jacobs | Jan. 29, 1952 |